United States Patent Office 3,152,404
Patented Oct. 13, 1964

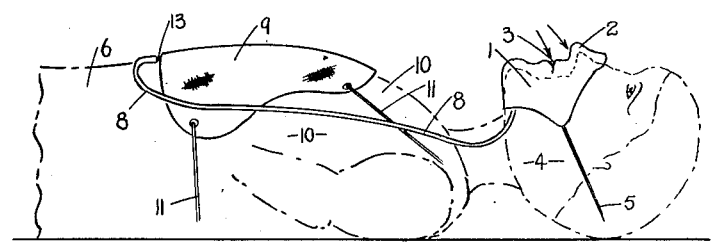
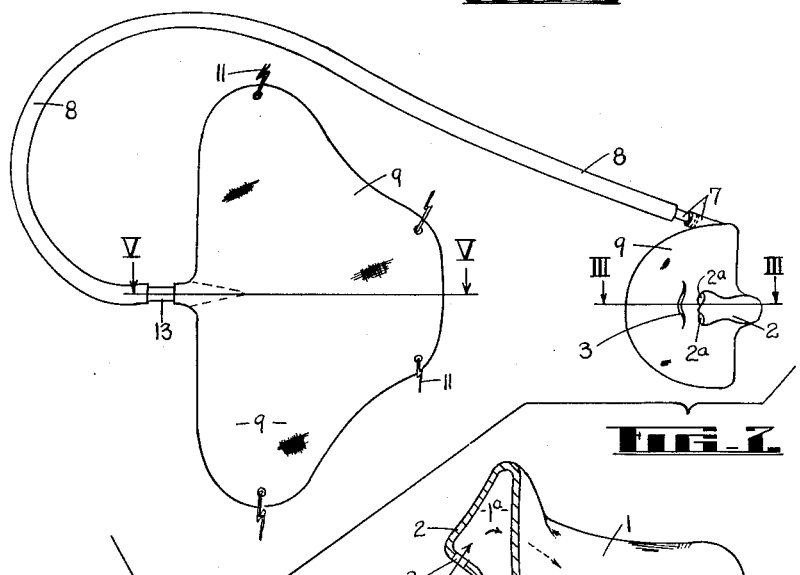
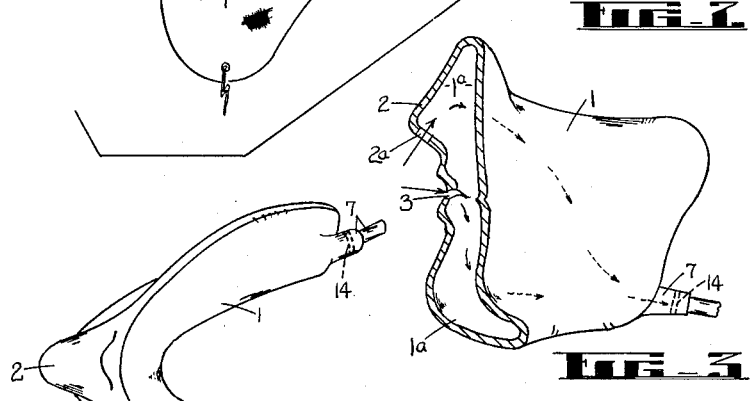
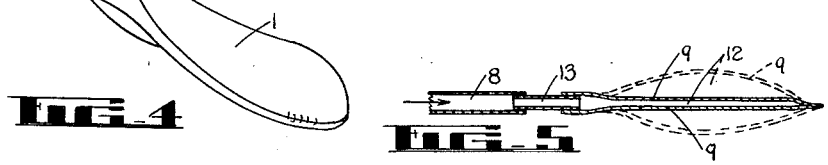

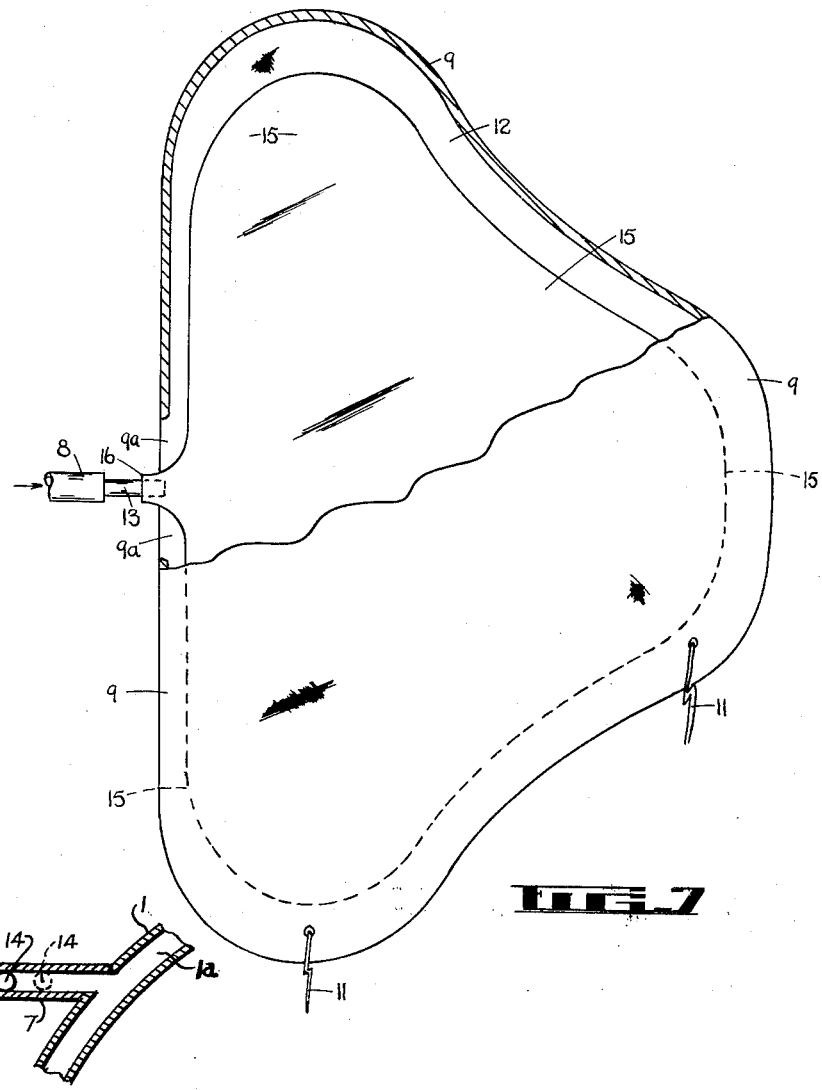

3,152,404
APPARATUS FOR TEACHING RESUSCITATION
Max Cheshire and Hugh A. Wilson, both of 387 St. Asaph
St., Christchurch, Canterbury, New Zealand
Filed Jan. 22, 1962, Ser. No. 167,607
Claims priority, application New Zealand Jan. 27, 1961
4 Claims. (Cl. 35—17)

This invention relates to apparatus for demonstrating, training and teaching resuscitation and lifesaving techniques, and more particularly to apparatus for demonstrating, training and teaching mouth-to-mouth resuscitation.

One of the more efficient forms of resuscitation is the mouth-to-mouth method whereby breathing in apparently drowned or electrocuted persons can be induced by a person breathing into the mouth or nose of the patient so as to create movement in the lungs of the patient in an endeavour to re-start breathing in the patient.

Due to the nature and form of this method of resuscitation it is difficult and unpleasant to demonstrate, teach and train people in the method due to the necessity of having mouth-to-mouth contact between an instructor or pupil and a simulated "patient," and also the fact that the method of resuscitation cannot be effectively carried out on a person who is breathing normally and whose breathing is not impaired.

It is an object of this invention to provide an apparatus which can be used by an instructor or pupil and a simulated "patient" whereby the method of mouth-to-mouth or mouth-to-nose resuscitation can be demonstrated and taught, and persons trained how to perform the method of resuscitation without actual mouth-to-mouth or mouth-to-nose contact between the instructor or pupil applying resuscitation and the "patient," and at the same time the apparatus is visible to the users thereof so as to demonstrate visually the effects of the resuscitation.

According to this invention the apparatus for demonstrating, training and teaching resuscitation and lifesaving techniques comprises a mask having a slit or cut portion representing a mouth and an aperture or apertures representing a nose or nasal passage, the mask being adapted for attachment to the face of a simulated "patient," An inflatable member representing lungs and adapted for attachment to the chest of a simulated "patient," is provided as well as a connection between the mask and the inflatable member, such connection being a passage or passages or common chamber providing communication between the mask and the inflatable member. The arrangement is such that in applying resuscitation on the simulated "patient" a person can apply his mouth to the representative mouth or nose of the mask and in so doing can also cover or close the representative mouth or nose of the mask not being used. Upon breathing into the mask his breath is transmitted by way of the passage or passages or common chamber into the inflatable member which inflates so that a person practising resuscitation can observe the effect of breathing into the mouth and/or nose of the mask attached to the simulated "patient" and can learn to carry out the method of mouth-to-mouth or mouth-to-nose resuscitation.

The invention will now be more particularly described with reference to the accompanying drawings, in which:

FIGURE 1 is a side view of the apparatus shown fitted to a simulated "patient,"

FIGURE 2 is a plan view of the apparatus removed from the "patient,"

FIGURE 3 is an enlarged cross-section of the mask on line III—III of the mask of FIGURE 2, the arrows indicating the passage or direction of air-flow, FIGURE 4 is a plan view of FIGURE 3, FIGURE 5 is a cross-section on line V—V of FIGURE 2 of the inflatable member, the dotted outline illustrating an inflated position, FIGURE 6 is a cross-section of the inflatable member having a disposable member therein according to a modification of the invention, FIGURE 7 is a broken plan view of the inflatable member of FIGURE 6, and FIG. 8 is a fragmentary sectional view showing a modified form of the invention incorporating a check valve.

In the application of mouth-to-mouth resuscitation it is usual for resuscitation to be applied by mouth-to-mouth and it is necessary, in practice, to cover the nasal passages of the patient so that air breathed into the patient does not escape from the nose and it is also possible to apply this method of resuscitation by mouth-to-nose whereby the resuscitator applies his mouth over the nostrils of the patient and covers the mouth and breathes air into the patient through the nose of the patient.

As shown in the drawings, the apparatus of this invention has a mask 1 intended to represent the lower portion of the human face and incorporating therein the features of a nose 2 and a mouth 3. The mask 1 can be made of resilient material such as rubber and is double sided or hollow so that air when breathed into the mask 1, can be received inside 1a of the mask; and the nasal features 2 of the mask 1 have provided therein one or two apertures 2a whereby air can be breathed into the inside 1a of the mask 1, and similarly the feature representing the mouth 3 is in the form of a slit or cut portion which can be pulled open by the hands (not shown) of a user such as the resuscitator and whereby air can be breathed into the inside 1a of the mask 1. The mask 1 is adapted and arranged to be loosely attached around the lower features of the face 4 of a simulated "patient" 6, the mask 1 being either held by a band 5 (shown only in FIGURE 1) passed around the face and head 4 of the simulated "patient" 6, or held in position by the simulated "patient," the method of attachment being such that a person wearing the mask 1 is not prevented from breathing normally when the mask 1 is in position.

Provided in and extending out of one side of the mask 1 is a hollow tube 7, and such hollow tube 7 is connected by an air-line 8 of any desired length, to an inflatable member 9 which is attached or secured around the chest 10 of the simulated "patient" 6.

The hollow interior 1a of the mask 1, together with the hollow tube 7 and air-line 8 may provide the connection in the form of the passage or passages or common chamber communicating the mouth 3 and nose 2 of the mask 1 with the interior of the inflatable member 9.

As shown in FIGURE 2 the inflatable member 9 is intended to represent the lungs of a "patient" and can be attached or secured to the chest of the simulated "patient" 6 by means of a band or bands 11 and the like secured around the body of the simulated "patient" 6 or by means of clips (not shown) which can be attached to the clothing (not shown) of the simulated "patient" 6. The inflatable member 9 is provided with a hollow interior 12 and is connected at one end or point by a hollow tube 13 into the air-line 8 leading from the mask 1 whereby ingress and egress of air is obtained for the inflatable member 9.

To demonstrate the apparatus of this invention when in use a person practising resuscitation applies his mouth to either the mouth 3 or nose 2 of the mask 1, covering and closing off the feature 2 or 3 not used, and breathes out into the mask 1 so that the exhaled breath is transmitted into the mask 1 and through the air-line 8 into the inflatable member 9 secured on or to the chest of the simulated "patient" 6. The entry of air in the inflatable member 9 inflates and expands the member 9 and on the resuscitator removing his mouth away from the mask 1 the inflatable member deflates and so demonstrates and shows to users of the apparatus and to others watching, the effect of the act of resuscitation. Such inflation and deflation of the inflatable member 9 (see FIGURE 5) represents the action of lungs, and illustrates the movement of a real patient's lungs when mouth-to-mouth or mouth-to-nose resuscitation is applied.

It is an essential feature in applying mouth-to-mouth resuscitation that a patient's head be tilted back so that there are no obstructions present in the wind pipe leading to the lungs, and in the use of this training and teaching apparatus should the head 4 of the simulated "patient" 6 be allowed, by the resuscitator or demonstrator, to fall forward, the "patient" 6 can grip or pinch the air line 8 with his hands (not shown) and so prevent and disrupt air from being transferred from the mask 1 into the inflatable member 9 to indicate to the resuscitator that something is wrong and needs correction and so cause the resuscitator to check his "patient" 6, and when the head 4 of the "patient" 6 is moved to a tilted back position then the "patient" 6 releases his pinching action of the air-line 8 and so permits the inflatable member 9 to be inflated when resuscitation is applied.

With particular reference to FIG. 8, there is shown a modified form of the invention in which the tubular fitting 7 connected to the mask 1 and communicating with the closed air space 1a between the walls of the mask is provided with a ball valve 14 disposed in the fitting 7 in a manner which permits movement of the same therein and passage of air around the ball, and on the interior of the fitting 7 there is provided a valve seat 14' with which the valve 14 may engage to prevent flow of air through the fitting 7.

With the subject in normal position as shown in FIG. 1, the ball valve 14 will be in the position shown in dotted lines in FIG. 8, which permits flow of air through the fitting 7 and normal operation of the apparatus. However, if the subject raises his head this results in the valve 14 moving from the dotted line position to the full line position in engagement with the seat 14', thereby preventing flow of air through the fitting 7, and this serves to simulate the result of such upward movement of the head of the subject during actual resuscitation by this method.

The mask 1 of the invention is preferably constructed from a resilient material such as rubber material which can be easily washed in or by a detergent and the like after use, and the inflatable member 9 can be constructed from a rubber or plastic or like material so that the apparatus of the invention is easily cleaned, is of light weight and can be stored away in a small space when not in use. In addition the use of relatively inexpensive materials in the construction of the apparatus provides for an inexpensive apparatus which can be acquired by instructors and persons interested in acquiring a cheap but effective apparatus for use in demonstrating the mouth-to-mouth method of resuscitation.

In a modification of the invention as shown in FIGURES 6 and 7 of the accompanying drawings, the inflatable member 9 is arranged so as to contain a disposable inflatable member 15, such disposable member 15 being in the form of a plastic bag and the like. The air-line 8 and connection 13 are detachably secured in an opening 16 of the disposable member 15 after the disposable member 15 has been placed inside the inflatable member 9.

In the use of the apparatus of this invention with a disposable member 15, the disposable member 15 is inserted in the hollow interior 12 of the inflatable member 9, through an opening or cut-away portion 9a in the member 9, and the tube 13 and air-line 8 is connected in the opening 16 of the disposable member 15. The inflatable member 9 is attached to a simulated "patient" as previously described and a user of the apparatus inflates and deflates the disposable member 15, such action also inflating and deflating the inflatable member 9, to demonstrate the resuscitation technique in the manner already described. At the conclusion of the demonstration or use of the apparatus, the disposable member 15 is removed from the inflatable member and discarded, so that as different operators or users use the apparatus a new, germ free, disposable member 15 is provided thereby preventing any contamination or infection of users due to germs exhaled by a previous user.

The disposable inflatable members 15 are preferably made of a light-weight inexpensive material such as plastic or polythene film, and because of the property of such material to stay inflated when air is placed therein the disposable member 15 is used in conjunction with the inflatable member 9 as described, the member 9 providing added weight to cause the disposable member 15 contained therein, to deflate when an operator's mouth is removed from the mask 1, thereby effectively illustrating the effect and action of a "patient's" lungs.

It will be understood that the inflatable member 9 of the first described form of the invention can itself be disposable after each use, although such use of the inflatable member 9 would substantially increase the cost of the apparatus.

Thus there is provided an apparatus which effectively demonstrates the mouth-to-mouth or mouth-to-nose method of resuscitation and which is particularly suitable for use in training and teaching a person or persons the techniques for the particular method of resuscitation. It is to be understood that the apparatus cannot be used in actual practice in the event of a person being subjected to drowning or electrocution.

What we do claim and desire to obtain by Letters Patent of the United States of America is:

1. Apparatus for teaching resuscitation, said apparatus comprising a face mask to be disposed over the face of a human subject, said mask having inner and outer spaced walls to provide a closed air space therebetween, said outer wall having a slit simulating the human mouth and communicating with said space, said outer wall having an aperture simulating the human nose and communicating with said space, a tube connected to said mask and communicating with said space, an inflatable member simulating the human lungs for disposition on the chest of the subject and means connecting said tube to the interior of said inflatable member, whereby mouth to mouth or mouth to nose resuscitation may be demonstrated by an instructor breathing into said slit or said aperture while closing the other to cause inflation and deflation of said inflatable member thereby demonstrating the effect of such resuscitation on the lungs.

2. Apparatus as defined in claim 1 in which said mask is made of flexible air impervious material and simulates the lower portion of the face including the chin, mouth and nose.

3. Apparatus as defined in claim 1 in which said inflatable member comprises an outer flexible cover member and a disposable inner inflatable member removably received in said cover member, said tube being connected to said inner inflatable member.

4. Apparatus as defined in claim 1 in which a tubular fitting is connected to said mask and communicates with said space, a ball valve movably disposed in said fitting and a valve seat in said fitting, said tube being connected to said fitting, whereby with the subject in a supine position said ball valve moves away from said seat to permit air flow through said fitting and upon upward and forward movement of the head of the subject said ball valve moves into engagement with said seat to prevent air flow from said space through said fitting.

References Cited in the file of this patent

UNITED STATES PATENTS

| | | |
|---|---|---|
| 2,465,973 | Bulbulian | Mar. 29, 1949 |
| 2,477,706 | Taylor | Aug. 2, 1949 |
| 2,876,766 | Rebikoff et al | Mar. 10, 1959 |
| 2,891,540 | Tietze | June 23, 1959 |
| 2,904,898 | Marsden | Sept. 22, 1959 |